(12) United States Patent
Melechko et al.

(10) Patent No.: US 7,962,422 B1
(45) Date of Patent: Jun. 14, 2011

(54) REDIRECTION OF DELIVERIES

(75) Inventors: Valeria Melechko, Redmond, WA (US); Michael W. Nail, Seattle, WA (US); Jeremy Brian Hanni, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 281 days.

(21) Appl. No.: 12/329,940

(22) Filed: Dec. 8, 2008

(51) Int. Cl.
*G06Q 99/00* (2006.01)
*G06Q 10/00* (2006.01)
*G06G 1/12* (2006.01)

(52) U.S. Cl. ............ 705/338; 705/1.1; 705/21; 705/333
(58) Field of Classification Search .................... 705/1.1, 705/8, 21, 26, 28, 333, 338
See application file for complete search history.

(56) References Cited

U.S. PATENT DOCUMENTS

| | | | | |
|---|---|---|---|---|
| 7,272,571 B2 * | 9/2007 | Tuttrup et al. | ............... | 705/22 |
| 7,672,874 B2 * | 3/2010 | Bezos et al. | ............... | 705/26 |
| 2002/0103724 A1 * | 8/2002 | Huxter | ............... | 705/28 |
| 2002/0111914 A1 * | 8/2002 | Terada et al. | ............... | 705/60 |
| 2002/0165729 A1 * | 11/2002 | Kuebert et al. | ............... | 705/1 |
| 2002/0178107 A1 * | 11/2002 | Biancavilla | ............... | 705/37 |
| 2003/0023690 A1 * | 1/2003 | Lohtia | ............... | 709/206 |
| 2003/0177072 A1 * | 9/2003 | Bared | ............... | 705/26 |
| 2004/0030604 A1 * | 2/2004 | Young | ............... | 705/26 |
| 2004/0133446 A1 * | 7/2004 | Myrick et al. | ............... | 705/1 |
| 2004/0153370 A1 * | 8/2004 | Yang | ............... | 705/26 |
| 2004/0243279 A1 * | 12/2004 | Boden et al. | ............... | 700/214 |
| 2004/0267640 A1 * | 12/2004 | Bong et al. | ............... | 705/28 |
| 2005/0228705 A1 * | 10/2005 | Irwin | ............... | 705/8 |
| 2006/0149640 A1 * | 7/2006 | Gordon et al. | ............... | 705/26 |
| 2006/0229895 A1 * | 10/2006 | Kodger, Jr. | ............... | 705/1 |
| 2006/0287898 A1 * | 12/2006 | Murashita et al. | ............... | 705/5 |
| 2007/0005452 A1 * | 1/2007 | Klingenberg et al. | ............... | 705/27 |
| 2007/0088566 A1 * | 4/2007 | Berkelhamer et al. | ............... | 705/2 |
| 2007/0150375 A1 * | 6/2007 | Yang | ............... | 705/26 |
| 2009/0106124 A1 * | 4/2009 | Yang | ............... | 705/26 |
| 2009/0228325 A1 * | 9/2009 | Simmons et al. | ............... | 705/10 |
| 2009/0248544 A1 * | 10/2009 | Ganz | ............... | 705/27 |

* cited by examiner

*Primary Examiner* — Fadey S Jabr
(74) *Attorney, Agent, or Firm* — Thomas, Kayden, Horstemeyer & Risley, LLP

(57) ABSTRACT

Disclosed are various embodiments for redirecting orders based on delivery site unavailability. A first delivery site that will be unavailable during an unavailability period is identified, and a coincidence between the unavailability period and a pick-up period of a shipment at the first delivery site is determined, the shipment being currently scheduled to be picked up by a customer at the first delivery site during the pick-up period. A second delivery site is then determined. A notification is sent to the customer of the second delivery site, and a rerouting of the shipment to the second delivery site is initiated.

29 Claims, 3 Drawing Sheets

REDIRECTION OF DELIVERIES

BACKGROUND

Online merchants may offer in-store pickup at brick-and-mortar store locations as a delivery option. However, brick-and-mortar store locations may close down or relocate with little advance notice.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The delivery redirection system described herein relates to redirecting a shipment based upon a closure or other change in status of a delivery site. When placing an order with a merchant, a customer may prefer to have the order shipped to a nearby delivery site instead of, for example, a personal address or a business address. The merchant may provide, for example, a list of delivery sites to the customer that are near an address, within a city or other geographic area, etc. These delivery sites may include, for example, a store, locations of a chain of stores, delivery entity service centers, and other locations.

However, a given delivery site may close down or otherwise become unavailable before the customer picks up the order shipment. In another case, a delivery site may be temporarily closed during a time period that was set for the customer to pick up the order shipment. This may happen, for example, if the delivery site is a store and the owner goes on vacation. These delivery site closures may be unexpected and, in particular, unforeseen at the time the customer places his or her order. In the following discussion, a general description of the delivery redirection system and its components is provided, followed by a discussion of the operation of the same.

Figure 1:
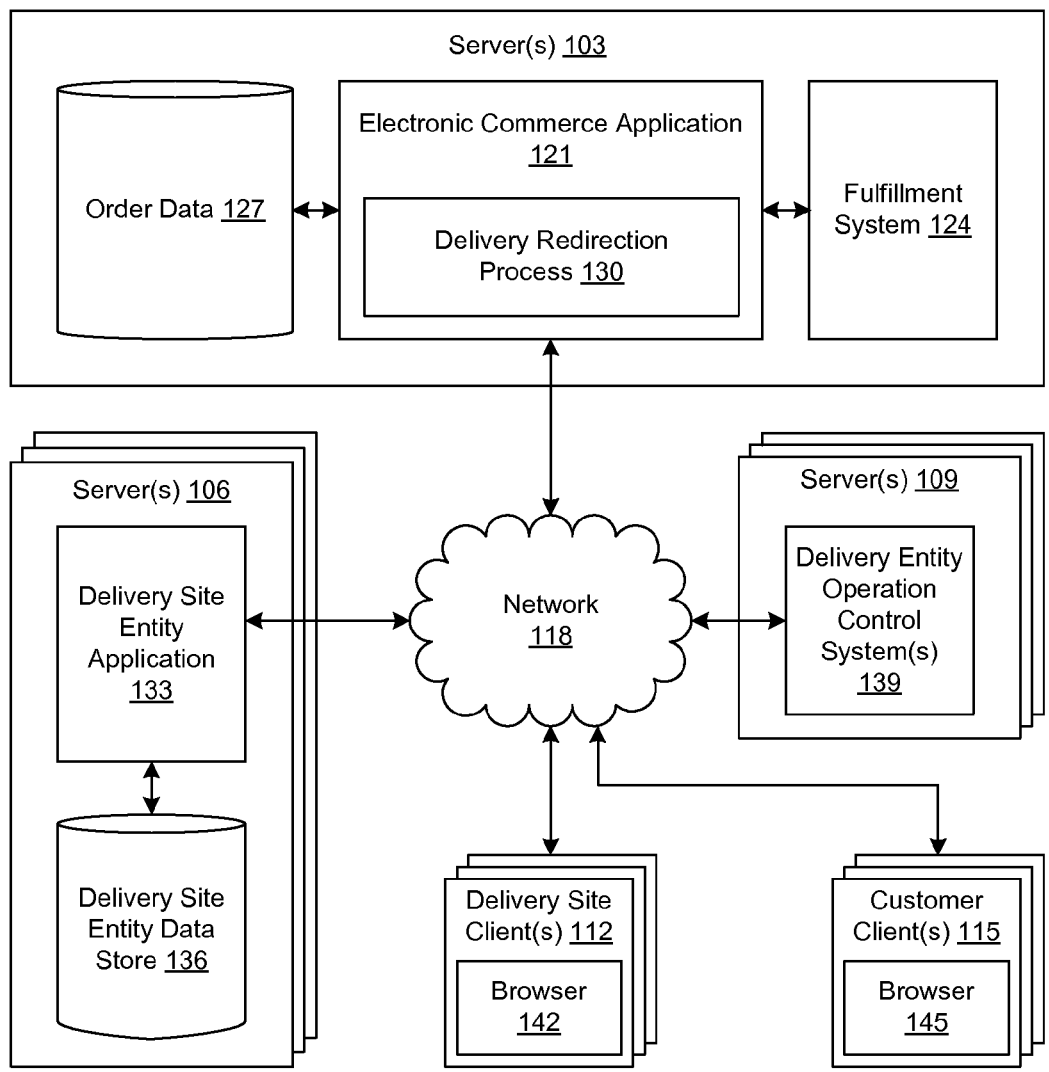
FIG. 1 is a drawing of a networked environment according to an embodiment of the present disclosure.

With reference to FIG. 1, shown is a networked environment 100 according to various embodiments of the present disclosure. The networked environment 100 includes one or more servers 103 that are in data communication with servers 106, servers 109, delivery site clients 112, and customer clients 115 by way of a network 118. The network 118 includes, for example, the Internet, intranets, extranets, wide area networks (WANs), local area networks (LANs), wired networks, wireless networks, or other suitable networks, etc., or any combination of two or more such networks.

The server 103 may comprise one or more server computers arranged in a server bank or other arrangement. The server 103 may be localized in a single location or may comprise one or more servers 103 distributed across diverse geographic areas.

The server 103 includes an electronic commerce application 121, a fulfillment system 124, order data 127, and potentially other applications and data. Associated with the electronic commerce application 121 is a delivery redirection process 130. The electronic commerce application 121 may be employed to take and process orders from customers. The order data 127 is a data store that may be used to store data relating to orders, including, but not limited to, orders that have been placed but describe shipments that have not been picked up by the customer. The fulfillment system 124 is used to prepare shipments relating to orders, which may include generating at least one shipping manifest for fulfillment at a shipping warehouse.

The delivery redirection process 130 may use, in one embodiment, a workflow execution application to perform various tasks. Such a workflow execution application may have a plurality of workflow definitions, each defining a particular workflow including one or more tasks. Such tasks may be performed asynchronously or synchronously. The workflow definitions may be stored, for example, in a data store. Such workflow definitions may be written, for example, in any workflow process definition language, such as XPDL, BPEL, or any other language capable of describing workflows.

It is also understood that the server 103 may be employed to execute other applications and access other data beyond those described above.

The server 106 may comprise one or more server computers arranged in a server bank or other arrangement. The server 106 may be localized in a single location or may comprise one or more servers 106 distributed among diverse geographic areas. As a nonlimiting example, the server 106 may be a corporate server of a particular delivery site entity, such as a chain of stores, etc. As another nonlimiting example, the server 106 may be operated by a third-party provider of information regarding the particular delivery site entity or multiple delivery site entities.

The server 106 includes a delivery site entity application 133 and a delivery site entity data store 136. The delivery site entity data store 136 may include status information relating to a plurality of delivery sites. This status information may include availability and/or unavailability information related to each of a plurality of delivery sites and other information. The unavailability information may specify, for example, that a delivery site is permanently closed as of a certain date, a period of closure for the delivery site, and/or any other information describing unavailability, whether temporary or permanent, of a delivery site. An unavailability period may be expressed, for example, as an unavailability starting date and an unavailability ending date, as an unavailability starting date and an unavailability duration, or through any other combination of data that can be employed to describe unavailability periods. Specific unavailability times may be specified using, for example, a time stamp, etc. Additionally, there may be a plurality of unavailability periods provided for a given delivery site.

It is also understood that the server 106 may be employed to execute other applications and access other data beyond those described above. Additionally, the delivery site entity application 133 and the delivery site entity data store 136 may reside on other servers beyond server 106, such as, for example, server 103 or some other location.

The server 109 may comprise one or more server computers located in a server bank or other arrangement. The server 109 may be localized in a single location, or may comprise one or more servers 109 distributed across diverse geographic areas.

The server 109 includes a delivery entity operation control system 139. The delivery entity operation control system 139 may have an interface allowing other applications to schedule the shipping of orders with a delivery entity over the network 118. The delivery entity operation control system 139 may also be configured to provide status information for a particular shipment, redirect shipments currently in transit to alternate delivery locations, schedule pick-up of shipments at remote locations, and/or other functions. In various embodiments, the delivery entity operation control system 139 may be associated with a third-party delivery entity, such as a common carrier or other entity. The functionality provided by the delivery entity operation control system 139 may depend on what may be provided by the particular delivery entity, in which case not all functions may be available for all shipments. Such availability of functionality may be based on, for example, account privileges of the merchant, destination addresses, etc.

It is also understood that the server 109 may be employed to execute other applications and access other data beyond those described above. Additionally, the delivery entity operation control system 139 may reside on other servers instead, such as, for example, server 103 or server 106.

Each of the delivery site clients 112 and customer clients 115 may comprise, for example, a computer system such as a desktop, laptop, or other computer system. The delivery site clients 112 and the customer clients 115 may also comprise personal digital assistants, cellular telephones, set-top boxes, or other systems with like capability. Further, the delivery site clients 112 and customer clients 115 may also comprise any device that is network capable that may communicate with the server 103 over the network 118 to perform various functions. Such delivery site clients 112 and customer clients 115 may comprise, for example, processor-based devices having processor circuits comprising a processor and a memory.

The delivery site clients 112 may be configured to execute various applications such as a browser application 142 or other applications. The browser application 142 or another thin or thick client application may be executed in a delivery site client 112, for example, to access and render web pages or other network content served up by the server 103 or other servers.

The customer clients 115 may be configured to execute various applications such as a browser application 145 or other applications. The browser application 145 or another thin or thick client application may be executed in a customer client 115, for example, to access and render web pages or other network content served up by the server 103 or other servers.

Next, a general description of the operation of the various components of the networked environment 100 is provided. A customer client 115 associated with a customer interacts over the network 118 with the electronic commerce application 121 executing on the server 103 to place an order. Such interaction may occur, for example, through the browser application 145 or another application executing on the customer client 115. In the process of placing an order, the electronic commerce application 121 provides a list of potential delivery sites to the customer client 115. This list of potential delivery sites may be based, for example, on an address provided by the customer client 115, or other geographic location. The list of potential delivery sites may also be chosen based upon a geographic location correlated with an IP address associated with a customer client 115 on the network 118. A geographic location may also be determined through the global positioning system (GPS) if the customer client 115 is a GPS-enabled device such as a cell phone, personal digital assistant, or other device. Alternatively, the electronic commerce application 121 may provide a list of all delivery sites to the customer client 115, thereby allowing a customer to choose any delivery site. Such a list may be organized by geographic location to facilitate ease of selection.

The electronic commerce application 121 may obtain a list of delivery sites from the delivery site entity application 133 over the network 118 or from some other source. Such a listing may be updated with the current availability information from the delivery site entity data store 136. By obtaining updated information from the delivery site entity application 133, the electronic commerce application 121 can make an initial determination as to which delivery sites are scheduled to be available during a time when the shipment associated with the order may be picked up by the customer.

A pick-up time period may be determined automatically by the electronic commerce application 121 based upon availability of products and estimated time of transit to a location associated with the customer or by other methods. Alternatively, the customer client 115 may supply a desired pick-up time period to the electronic commerce application 121. The pick-up time period may be expressed as a date, a range of dates, a start time and an end time, or by any other method of representing a time period. If the pick-up time period is determined automatically, the electronic commerce application 121 may be configured to seek confirmation of the pick-up time period from the customer client 115. Alternatively, the electronic commerce application 121 may use such an automatically determined pick-up time period without confirmation. Once a pick-up time period is determined, a delivery site may be chosen, either automatically or by the customer. Alternatively, once a delivery site is determined, a pick-up time period may be selected by the customer client 115 based upon availability at the selected delivery site.

The electronic commerce application 121 may also allow the customer client 115 to select a plurality of alternate delivery sites to be used if the preferred delivery site is or becomes unavailable for some reason. Availability of a delivery site may depend on several criteria, including, but not limited to, whether the delivery site is open, whether it accepts deliveries, whether it has sufficient storage space to hold deliveries, whether it can accept shipments of a certain size, whether it can accept shipments that are perishable or otherwise require special handling, and other criteria. Examples of shipments that may require special handling include, but are not limited to, shipments containing high value items such as jewelry, shipments containing live animals, shipments containing controlled substances, shipments that require refrigeration, etc. A delivery site may become unavailable, for example, when the shipment is being fulfilled, when the shipment is in transit, etc. A listing of the alternate delivery sites may be ordered or not ordered.

How a delivery site is chosen from this list if a contingency arises may depend upon the configuration of the electronic commerce application 121. For example, the electronic commerce application 121 may be configured to select automatically from the list the delivery site that is next closest relative to an address or location of the customer. In another example, the electronic commerce application 121 may be configured to select automatically from the list the delivery site that is next closest relative to the delivery site that was initially or previously selected. In yet another example, the list may be ordered by the customer. There may be many such configurations. Additionally, multiple selections from such a list may be necessary if multiple delivery sites become unavailable or are otherwise not capable of taking delivery during the scheduled pick-up time period or any other pick-up time period agreed upon by the customer.

Once an order is placed, the electronic commerce application 121 may submit the order to the fulfillment system 124 to initiate the fulfillment process. The electronic commerce application 121 may also store the order in the order data 127.

It may be the case that some amount of time will elapse between the time an order is placed and the time the order is shipped. During this time, which may be brief or last days, weeks, months, or even years in some cases, the delivery site selected either by the electronic commerce application 121 or the customer client 115 may relocate, close down, temporarily close, or otherwise become unavailable. Such an unavailability of the delivery site may occur during the time period that has been selected for the customer to pick up the shipment at the delivery site.

To handle such delivery site closures, the delivery redirection process 130 may obtain status information about the delivery sites, including availability-related information. In some embodiments, the delivery redirection process 130 may obtain only unavailability-related information. To obtain such information, the delivery redirection process 130 may be configured to poll the delivery site entity application 133 on the server 106 over the network 118. Such polling may occur on a regular basis or may be event driven. Alternatively, the delivery site entity application 133 may provide a data feed containing the availability information to the delivery redirection process 130 over the network 118 on a regular basis. In other embodiments, the delivery site client 112 may provide availability information to the electronic commerce application 121 over the network 118.

The delivery site entity application 133 obtains delivery site availability information from the delivery site entity data store 136. There may be a plurality of delivery site entity data stores 136, which may reside on the same or different servers as the server 106. The delivery site entity application 133 may also obtain delivery site availability information over the network 118 from delivery site clients 112, which may be associated with particular delivery sites. Also, there may be a plurality of delivery site entity applications 133, each providing information about one or more delivery sites.

Upon obtaining or retrieving the availability information, the delivery redirection process 130 may then determine orders that may be affected by a newly discovered delivery site closure or unavailability, for example, by searching for affected orders in the order data 127. In another embodiment, the delivery redirection process 130 may determine, for each order in the order data 127, whether the order is affected by any delivery site unavailability. Such processes, for example, may be event driven or occur on a regular basis. To determine whether an order is affected, the delivery redirection process 130 determines whether there is a coincidence between the pick-up time period for a shipment at the delivery site and the unavailability time period associated with the delivery site.

After the delivery redirection process 130 identifies a shipment that may be affected by a delivery site unavailability, the delivery redirection process 130 may then determine alternate delivery sites and/or alternate pick-up time periods. Such alternate delivery sites and alternate pick-up time periods may be predetermined by the customer when the customer places the order. In other embodiments, the delivery redirection process 130 may automatically select alternate delivery sites by determining which delivery sites are nearest to the delivery site that was initially chosen, by determining which delivery sites are nearest to an address or location associated with the customer who placed the order, or by some other method. In other embodiments, the delivery site client 112 may provide one or more alternate delivery sites to the delivery redirection process 130. Such alternate delivery sites may be near the delivery site scheduled to be unavailable or may be determined by some other method.

In one embodiment, alternate pick-up time periods may be preselected by the customer. To illustrate, in one example, the customer may initially select a pick-up time period that may span several days during the process of placing the order using the customer client 115. The electronic commerce application 121 may then choose a pick-up time period of shorter duration within the customer-selected pick-up time period and may notify the customer. In such a case, the delivery redirection process 130 may then select a next pick-up time period from within the preselected pick-up time period. In other embodiments, the customer may define and select multiple pick-up time periods. Other methods of preselecting pick-up time periods may be used. In other embodiments, the delivery redirection process 130 may automatically determine alternate pick-up time periods. Alternatively, the delivery redirection process 130 may be configured to use only the initially selected pick-up time period.

The delivery redirection process 130 may then determine if the alternate delivery sites are capable of taking delivery of the shipment and/or making the shipment available for pick-up by the customer during the original and/or alternate pick-up time periods. Then, the delivery redirection process 130 may be configured to send a notification to the customer. Such a notification may state that the initial delivery site is now unavailable and may provide to the customer alternate delivery sites and/or alternate pick-up time periods. The actual contents of this notification may vary based upon configuration of the delivery redirection process 130. The notification may be made through a variety of means including email, fax, text message, telephone call, voicemail, and/or any other method of notification.

Once the customer is notified, the customer client 115 may then provide to the delivery redirection process 130 a selected delivery site and/or pick-up time period to be used in redirecting the shipment. Alternatively, the new delivery site and/or the new pick-up time period may be predetermined by the customer and may be selected automatically by the delivery redirection process 130. In some cases, the new delivery site may be the same as the old delivery site, but with a new time period for pick-up that does not coincide with a closure time period of the delivery site. When a new delivery site and/or pick-up time period is determined, then the delivery redirection process 130 may initiate a rerouting of the shipment in the server 103 if deemed necessary by communicating with the fulfillment system 124. When generating a shipping manifest for the shipment, the fulfillment system 124 can thus specify the new delivery site address, new pick-up time period, and/or new delivery time period associated with the new pick-up time period.

If the order has shipped and is currently in transit with a delivery entity, the delivery redirection process 130 may then attempt to redirect the shipment by communicating with the delivery entity operation control system 139 over the network 118. Depending upon the capabilities of the delivery entity operation control system 139, the delivery redirection process 130 may or may not be able to redirect the shipment. Further, depending upon the progress of the shipment in transit, the delivery entity operation control system 139 may not be capable of receiving a new delivery site address. If the shipment is in transit with the delivery entity but the delivery site address cannot be changed, then the shipment may be delivered to the first delivery site. In such a case, the first delivery site may be open or closed at the time of delivery. If the first delivery site is closed at the time of delivery, for example, then the delivery entity operation control system 139 may return the shipment back to the merchant, redirect the shipment to the new delivery site address as provided by the delivery redirection process 130 to the delivery entity operation control system 139, or perform some other handling of the shipment.

In another example, if the first delivery site is open and takes delivery of the shipment, the first delivery site may keep the shipment until it closes or becomes unavailable. The first delivery site may then report to the electronic commerce application 121 through the delivery site client 112 that the shipment has arrived at the first delivery site. In such a case, the electronic commerce application 121 may notify the customer and/or take other appropriate action. In such a case, the pick-up time period selected by the customer may include a time period that the first delivery site is open. The customer may then be able to pick up the shipment at the first delivery site during this time period.

However, if the shipment is not picked up by the customer at the first delivery site before the first delivery site closes, or if the pick-up time period lies entirely within an unavailability time period, the delivery redirection process 130 may instruct the delivery site client 112 over the network 118 to schedule a reshipping of the shipment from the first delivery site to the new delivery site. The delivery site client 112 may be configured to communicate directly with the delivery entity operation control system 139 over the network 118 or merely to relay this information over the network 118 to the delivery redirection process 130, which then can communicate with the delivery entity operation control system 139 over the network 118 to schedule a pick-up of the shipment. If such a delivery or reshipping is scheduled, the customer may be notified.

A given order may have multiple shipments scheduled for delivery at multiple delivery sites. The shipments may also have multiple pick-up time periods. The networked environment 100 may handle multiple shipments, multiple delivery sites, and multiple pick-up time periods in like manner as described above.

Figure 2:
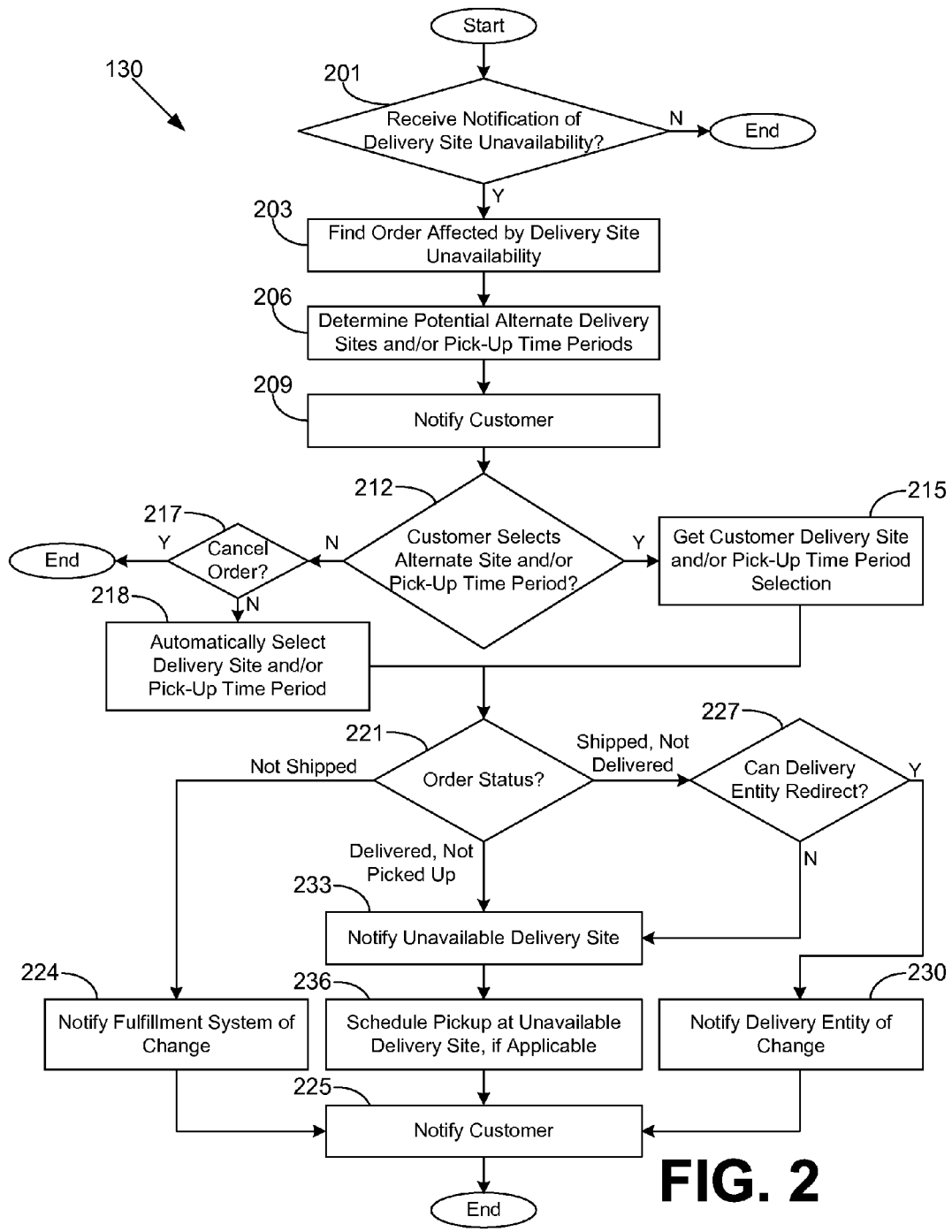
FIG. 2 is a flowchart that provides one example of functionality for a delivery redirection process employed in the networked environment of FIG. 1 according to an embodiment of the present disclosure.

Turning now to FIG. 2, shown is a flowchart that provides one example of the operation of the delivery redirection process 130 (FIG. 1) according to various embodiments. It is understood that the flowchart of FIG. 2 provides merely an example of the many different types of functional arrangements that may be employed to implement the operation of the delivery redirection process 130 as described herein. As an alternative, the flowchart of FIG. 2 may be viewed as depicting an example of steps of a method implemented in the server 103 (FIG. 1) according to one or more embodiments.

To begin, in box 201, the delivery redirection process 130 determines whether a notification of delivery site unavailability has been received. The delivery redirection process 130 ends if such a notification has not been received. If a notification of delivery site unavailability has been received, in box 203, the delivery redirection process 130 searches to find an order affected by a delivery site unavailability within the order data 127 (FIG. 1). This may involve the delivery redirection process 130 scanning each order to determine whether it is affected by a particular store closure. Alternatively, the delivery redirection process 130 may be a process performed, for example, as part of an order workflow. In such a case, the delivery redirection process 130 may determine whether a particular order is affected by any delivery site unavailability, for example, by searching availability information provided by the delivery site entity application 133 (FIG. 1)

Next, in box 206, the delivery redirection process 130 determines alternate delivery sites and/or pick-up time periods. The alternate delivery sites may be preselected or predetermined by the customer, or they may be determined based upon proximity to a location of a customer or proximity to the first delivery site or some other method. The alternate pick-up time periods may be nearest in time to the previously selected time period, may be the next available at the previously selected delivery site, may be preselected or predetermined by the customer, and/or may be chosen by some other method.

Next, in box 209, the delivery redirection process 130 notifies the customer. Such a notification may be through email, fax, text message, telephone call, voicemail, and/or any other method of notification. The notification may include directions for the customer to select one or more alternate delivery sites and/or one or more alternate pick-up time periods, or it may simply notify the customer of a new delivery site and/or pick-up period that have been predetermined or automatically determined. The notification may include other pertinent contents.

In box 212, a decision is made based upon whether the customer is to select the alternate delivery site and/or pick-up time period. If the customer is to select the alternate delivery site and/or pick-up time period, the process moves to box 215 and then obtains a delivery site and/or pick-up time period selection from the customer through the customer client 115 (FIG. 1). The selection or selections may be made by the customer using a network page such as a web page, an email, a text message, a telephone, or by some other method. If the customer is not to select an alternate delivery site and/or pick-up time period in box 212 or decides not to do so, then the delivery redirection process 130 moves to box 217 and determines whether the order is to be canceled. Whether the order is to be canceled may depend on additional input from the customer in some cases. If the order is not to be canceled, the delivery redirection process 130 will automatically select an alternate delivery site and/or pick-up time period in box 218.

At this point, an alternate delivery site and/or an alternate pick-up time period are selected, and the delivery redirection process 130 may, in some embodiments, contact the delivery site client 112 (FIG. 1) to determine whether the delivery site is available and is capable of taking delivery of the shipment, for example. In other embodiments, the delivery site entity application 133 may provide data indicating the capacity and other shipment restrictions for a plurality of delivery sites. Then, the delivery redirection process 130 examines the status of the order shipment in box 221. If the order has not shipped, the process will notify the fulfillment system 124 (FIG. 1) of the change in box 224. The change may include a new delivery site address and/or a new delivery date associated with a new pick-up time period. Finally, in box 225, the delivery redirection process may notify the customer of changes in the delivery site and/or pick-up time period. The delivery redirection process 130 then ends.

If the order has shipped but the shipment has not yet been delivered in box 221, the delivery redirection process 130 determines whether the delivery entity can redirect the shipment in box 227. This may be determined, for example, by the delivery redirection process 130 communicating with the delivery entity operation control system 139 (FIG. 1) over the network 118 (FIG. 1). If, for example, the shipment is still in transit with the delivery entity and can be redirected, the delivery redirection process 130 then notifies the delivery entity of the change in the delivery site address in box 230. The delivery redirection process 130 may also or instead notify the delivery entity operation control system 139 of a new pick-up time period, if applicable. Finally, in box 225, the delivery redirection process may notify the customer of changes in the delivery site and/or pick-up time period. The shipment is then redirected or scheduled for a new pick-up time period, and the delivery redirection process 130 ends.

If the delivery redirection process 130 determines in box 227 that the delivery entity is not capable of redirecting the shipment, then the delivery redirection process 130 proceeds to box 233 and notifies the first delivery site that is scheduled to become unavailable. In this case, the shipment may arrive at the first delivery site and may be reshipped from the first delivery site to the alternate delivery site. Such reshipment may be unnecessary if a new pick-up time period at the same delivery site was selected. Next, in box 236, if the shipment is to be reshipped, the delivery redirection process 130 schedules a pick-up of the shipment by the delivery entity at the first delivery site, which is scheduled to become unavailable. Finally, in box 225, the delivery redirection process may notify the customer of changes in the delivery site and/or pick-up time period. The shipment is then scheduled for delivery at the new delivery site or scheduled for a new pick-up time period at the unavailable delivery site, and the delivery redirection process 130 ends.

In box 221, the delivery redirection process 130 may determine that the order has already been delivered to the first delivery site but has not yet been picked up. This may be the case if the electronic commerce application 121 (FIG. 1) or some other application has not yet been notified of a customer pick-up, if the pick-up time period as scheduled has not yet begun, or in other circumstances. If such a determination is made, then the delivery redirection process 130 notifies the first delivery site scheduled to become unavailable in box 233. Then, in box 236, the delivery redirection process 130 may schedule a pick-up of the shipment by the delivery entity at the first delivery site which is scheduled to become unavailable. Such a reshipment may be unnecessary if a newly selected pick-up time period at the same delivery site is not within an unavailability time period. Finally, in box 225, the delivery redirection process may notify the customer of changes in the delivery site and/or pick-up time period. The shipment is then redirected to the new delivery site or rescheduled for pick-up at the same delivery site, and the delivery redirection process 130 ends.

Figure 3:
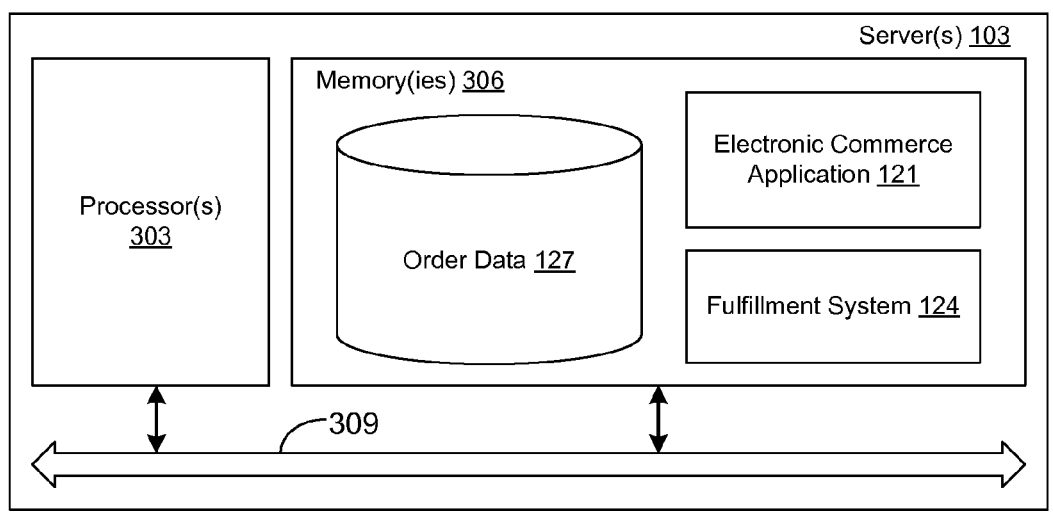
FIG. 3 is a schematic block diagram that illustrates one example of a server employed in the networked environment of FIG. 1 according to an embodiment of the present disclosure.

Referring next to FIG. 3, shown is a schematic block diagram of one example of a server 103 (FIG. 1) according to an embodiment of the present disclosure. The server 103 includes a processor circuit, for example, having a processor 303 and a memory 306, both of which are coupled with a local interface 309. To this end, the server 103 may comprise, for example, a server computer with such a structure. The local interface 309 may comprise, for example, a data bus with an accompanying address/control bus or other bus structure.

Stored in the memory 306 are both executable components and data. In particular, stored in the memory 306 and executable by the processor 303 are the electronic commerce application 121 (FIG. 1), the fulfillment system 124 (FIG. 1), and potentially other applications. Also stored in the memory 306 are the order data 127 (FIG. 1) and other data. In addition, a server operating system may be stored in the memory 306 and executable by the processor 303.

It is understood that there may be other applications stored in the memory 306 and executable by the processor 303. Also, other data may be stored in the memory 306 and accessed by the processor 303 associated with the operation of the electronic commerce application 121 and the fulfillment system 124. The electronic commerce application 121 and the fulfillment system 124 may be implemented using any one of, or combination of, a number of programming languages such as, for example, C, C++, C#, Visual Basic, VBScript, Java, JavaScript, Perl, Ruby, Python, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Although the various components executed on the one or more servers 103, 106, and 109 as described above are embodied in software or code executed by general purpose hardware as discussed above, as an alternative the various components executed on the one or more servers 103, 106, and 109 as described above may also be embodied in dedicated hardware or a combination of software/general purpose hardware and dedicated hardware. If embodied in dedicated hardware, the various components executed on the one or more servers 103, 106, and 109 as described above can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 2 shows the architecture, functionality, and operation of an implementation of portions of various components executed on the one or more servers 103, 106, and 109 as described above. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where any component implemented in the one or more servers 103, 106, and 109 of FIG. 1 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the various components executed on the one or more servers 103 as described above for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising the steps of:
   obtaining by a server a data feed including status information for each of a plurality of delivery sites, the status information describing an unavailability period for a first delivery site, the first delivery site being scheduled to be unavailable during the unavailability period;
   determining by the server a coincidence between the unavailability period and a first pick-up period of a shipment at the first delivery site, the shipment being currently scheduled to be picked up by a customer at the first delivery site during the first pick-up period;
   determining by the server at least one alternate delivery site and at least one alternate pick-up period;
   verifying that the at least one alternate delivery site is able to take delivery of the shipment for pick-up by the customer during the at least one alternate pick-up period;
   sending a notification from the server to the customer of the at least one alternate delivery site and the at least one alternate pick-up period; and
   initiating a rerouting by the server of the shipment to a second delivery site for delivery by a second pick-up period, the second delivery site and the second pick-up period being supplied by the customer to the server.

2. The method of claim 1, wherein the step of initiating a rerouting by the server of the shipment to a second delivery site for delivery by a second pick-up period further comprises sending a notification of the second delivery site and the second pick-up period from the server to an operation control system of a delivery entity when the shipment is currently in transit with the delivery entity.

3. The method of claim 1, wherein the step of initiating a rerouting by the server of the shipment to a second delivery site for delivery by a second pick-up period further comprises scheduling by the server a delivery of the shipment from the first delivery site to the second delivery site.

4. The method of claim 1, wherein the step of determining by the server at least one alternate delivery site and at least one alternate pick-up period further comprises selecting by the server, from a plurality of delivery sites, a subset of delivery sites that are nearest to the first delivery site.

5. A method, comprising the steps of:
   identifying by a server a first delivery site that will be unavailable during an unavailability period;
   determining by the server a coincidence between the unavailability period and a pick-up period of a shipment at the first delivery site, the shipment being currently scheduled to be picked up by a customer at the first delivery site during the pick-up period;
   determining by the server a second delivery site;
   sending a notification from the server to the customer of the second delivery site; and
   initiating a rerouting by the server of the shipment to the second delivery site.

6. The method of claim 5, wherein the step of initiating a rerouting by the server of the shipment to the second delivery site further comprises sending a notification of the second delivery site to an operation control system of a delivery entity when the shipment is currently in transit with the delivery entity.

7. The method of claim 6, wherein the delivery entity is a common carrier.

8. The method of claim 5, wherein the step of initiating a rerouting by the server of the shipment to the second delivery site further comprises scheduling by the server a delivery of the shipment from the first delivery site to the second delivery site.

9. The method of claim 5, wherein the step of determining by the server a second delivery site comprises the step of verifying by the server that a second delivery site is available to take delivery of the shipment for pick-up by the customer during a proposed pick-up period, the second delivery site being predetermined by the customer.

10. The method of claim 9, wherein the step of verifying by the server that a second delivery site is available further comprises the step of verifying that the second delivery site will accept deliveries for pick-up during the proposed pick-up period.

11. The method of claim 9, wherein the step of verifying by the server that a second delivery site is available further comprises the step of verifying that the second delivery site has sufficient storage capacity.

12. The method of claim 9, wherein the step of verifying by the server that a second delivery site is available further comprises the step of verifying that the second delivery site can accommodate physical characteristics and handling requirements associated with the shipment.

13. The method of claim 5, wherein the step of determining by the server a second delivery site comprises selecting by the server a next closest delivery site relative to a predefined location from a plurality of delivery sites.

14. The method of claim 13, wherein the predefined location is the first delivery site.

15. The method of claim 13, wherein the predefined location is a location associated with the customer.

16. The method of claim 5, wherein the step of determining by the server a second delivery site further comprises sending a notification from the server to the customer of at least one alternate delivery site.

17. The method of claim 16, wherein the second delivery site is a selected one of the at least one alternate delivery sites supplied by the customer to the server.

18. The method of claim 5, wherein the pick-up period differs from a different pick-up period associated with the second delivery site.

19. The method of claim 5, wherein the first delivery site will be closed during the unavailability period.

20. A system, comprising:
at least one server;
order data stored in a memory accessible by the at least one server; and
a delivery redirection process executable in the at least one server, the delivery redirection process being configured to:
 obtain a data feed from a delivery site closure information provider, the data feed identifying a first delivery site that will be unavailable during an unavailability period;
 determine a coincidence using the order data between the unavailability period and a pick-up period of a shipment at the first delivery site, the shipment being currently scheduled to be picked up by a customer at the first delivery site during the pick-up period;
 determine a second delivery site;
 send a notification to the customer of the second delivery site; and
 initiate a rerouting of the shipment to the second delivery site.

21. The system of claim 20, wherein the delivery redirection process is further configured to send a notification of the second delivery site to an operation control system of a delivery entity when the shipment is currently in transit with the delivery entity.

22. The system of claim 21, wherein the delivery entity is a common carrier.

23. The system of claim 20, wherein the delivery redirection process is further configured to schedule a delivery of the shipment from the first delivery site to the second delivery site.

24. The system of claim 20, wherein the delivery redirection process is further configured to determine a second delivery site by using a second delivery site that has been preselected by the customer.

25. The system of claim 20, wherein the delivery redirection process is further configured to determine a second delivery site by selecting, from a plurality of delivery sites, a second delivery site nearest to the first delivery site.

26. The system of claim 20, wherein the delivery redirection process is further configured to determine a second delivery site by sending a notification to the customer of at least one alternate delivery site.

27. The system of claim 26, wherein the delivery redirection process is further configured to initiate a rerouting of the shipment for delivery at a selected one of the at least one alternate delivery sites supplied by the customer to the server.

28. The system of claim 20, wherein the pick-up period differs from a different pick-up period associated with the second delivery site.

29. The system of claim 20, wherein the delivery redirection process is further configured to update a respective order containing the shipment in the order data with the second delivery site.

* * * * *